United States Patent Office 3,051,751
Patented Aug. 28, 1962

3,051,751
SELECTIVE AMIDE FORMATION WITH 2-p-DIOXANONE
William W. Levis, Jr., Wyandotte, and Eugene A. Weipert, Detroit, Mich., and Harry Rubinstein, Bethlehem, Pa., assignors to Wyandotte Chemicals Corporation, Wyandotte, Mich., a corporation of Michigan
No Drawing. Filed Mar. 4, 1960, Ser. No. 12,662
8 Claims. (Cl. 260—561)

This invention relates to a process for reacting 2-p-dioxanone selectively with a primary amine group. In one of its aspects, this invention relates to a process for blocking a primary amine group in the presence of a nonheterocyclic amine group of higher order. In another of its aspects, this invention relates to a process for separating primary amines from nonheterocyclic amines of higher order. In still another of its aspects, this invention relates to a process for the selective hydroxyalkylation of compounds containing both a primary amine group and a nonheterocyclic amine group of higher order. In a further aspect, this invention relates to a process for the selective alkylation of compounds containing both a primary amine group and a nonheterocyclic amine group of higher order.

2-p-dioxanone is a known chemical made by the catalytic dehydrogenation of diethylene glycol, generally over a copper-chromium catalyst as disclosed in U.S. Patents Nos. 2,142,033 and 2,807,629. U.S. Patent No. 2,631,989 discloses that 2-p-dioxanone is useful as a plasticizer for acrylonitrile polymers, and U.S. Patent No. 2,803,646 discloses that it may be used as an intermediate in the preparation of ether-esters which are useful as plasticizers. We have discovered a new and nonanalogous use for 2-p-dioxanone which permits a simple solution to a problem which has heretofore required expensive, complicated or otherwise difficult means to cope with. This problem is concerned with systems containing both a primary amine group and a nonheterocyclic amine group of higher order wherein it is desirable or necessary to effect some physical or chemical operation on one of the groups, or compounds containing one of the groups, without physically or chemically disturbing the other. One such system is a mixture containing primary along with secondary and/or tertiary amines, all of which have boiling points so close together, or form azeotropes, so as to make separation by distillation impossible, or at least impractical. An example of such a mixture is one containing the various methyl amines. Other such mixtures immediately suggest themselves. Another system to which the present invention can be applied is one containing a compound having within its molecular structure one or more primary amine groups and one or more secondary and/or tertiary amine groups wherein it is desirable or necessary to effect a chemical reaction involving only the higher order amine group or groups, as for example, quaternization, alkylation or hydroxyalkylation. Illustratively, the process of the present invention can be employed to prepare N,N-bis(2-hydroxypropyl)ethylene diamine from N-(2-hydroxypropyl)ethylene diamine.

It is, therefore, an object of the present invention to provide a new and nonanalogous use for 2-p-dioxanone.

It is another object of this invention to provide a process for reacting 2-p-dioxanone selectively with a primary amine group.

It is still another object of this invention to provide a process for blocking a primary amine group in the presence of a nonheterocyclic amine group of higher order.

A further object of this invention is to provide a process for separating primary amines from nonheterocyclic amines of higher order.

Still another object of the present invention is to provide a process for the selective hydroxyalkylation of compounds containing both a primary amine group and a nonheterocyclic amine group of higher order.

Still another object of the present invention is to provide a process for the selective alkylation of compounds containing both a primary amine group and a nonheterocyclic amine group of higher order.

Other objects will be apparent from the description which follows.

In accordance with the present invention we have discovered that 2-p-dioxanone reacts selectively with primary amine groups in the presence of nonheterocyclic amine groups of higher order at temperatures below about 60° C. to form N-substituted-β-hydroxyethoxyacetamides which, once formed, are stable up to about 200° C. but which are capable of regenerating the original primary amine group on heating with strong alkali. Obviously the reaction should not be performed in systems containing strong alkali. Also, strong acids, either as constituents on the molecules being acted upon or in active form, should be avoided since, in general, they form salts with the primary amine group, effectively hampering the chemical activity of the 2-p-dioxanone therewith. Further, large concentrations of water should be avoided for the reason that water causes cleavage of the 2-p-dioxanone ring resulting in the formation of β-hydroxyethoxy acetic acid which is not effective for the purposes herein intended.

In carrying out the process of the present invention, 2-p-dioxanone can be employed, either in its monomeric form or as a polymer, such as for example, the polymer disclosed and described in detail in copending application Serial No. 12,660, filed March 4, 1960, of E. Weipert. In general, the monomer is regenerated from the polymer by simple heating. However, the polymer itself can be used directly in the process of the present invention. Thus, as used in this specification and in the claims, the term "p-dioxanone" is intended to include this material in either its monomeric or polymeric form.

As noted hereinbefore, care should be taken so that the temperature of the reaction mixture does not exceed about 60° C. since at temperatures above this level the p-dioxanone is capable of entering into reactions with secondary amine groups. Also, the presence of heterocyclic amine groups, such as piperazine or morpholine, should be avoided since p-dioxanone will react with the secondary amine groups of piperazine and morpholine under the conditions generally employed for reacting with primary amine groups. We have noted, however, that the presence of substituents on the carbon atoms adjacent to the nitrogen atom in the heterocyclic ring hinders the reaction of p-dioxanone with this secondary heterocyclic amine group so that "hindered" heterocyclic amine groups will not materially interfere with the reaction of 2-p-dioxanone with primary amine gruops. Thus, for example, the presence of 2,3,5,6-tetramethylpiperazine or 3,5-dimethylmorpholine would not hamper the reaction of p-dioxanone with a primary amine group under the conditions employed in the present process.

The quantities of 2-p-dioxanone employed in the process of the present invention are chosen such that there will be an equimolar quantity, or slight excess, of 2-p-dioxanone for each primary amine group to be reacted. Thus, for example, in the case of N-methylethylene diamine about 1 mol of p-dioxanone will be employed for every mol of N-methylethylene diamine, and in the case of diethylene triamine about 2 mols of p-dioxanone will be employed per mol of diethylene triamine. In the case of compounds having more than one primary amine group, although it is theoretically possible to block only one of the primary amine groups and effect some further reaction with the remaining unblocked primary and secondary amine groups, it is a matter of statistical probability whether or not the reaction product in fact contains a greater percentage of material having one of the primary amine groups blocked as opposed to having a mixture in which both amine groups are blocked on part of the material and none of the amine groups are blocked on another portion of the material. Thus, it can be seen that a better approach would be to block all of the primary amine groups in any given situation.

The real value and the scope of the contribution made to the art by the present invention can be best appreciated by consideration of the numerous situations in which it has applicability. For example, it can be used to effect separations of mixtures containing primary amines along with secondary and/or tertiary amines all of which have boiling points, or form azeotropes, which make separation by distillation impossible or impractical. Also, it can be used to block the primary amine group or groups in compounds containing these groups together with higher order nonheterocyclic amine groups, and permit further chemical reaction, consistent with the stability of the amide formed, at the other functional sites within the molecule. Thus, for example, in the case of N-alkyl alkylene diamines, after blocking with p-dioxanone, the secondary amine group therein may be alkylated, as with conventional alkylating agents, or may be quaternized, which is in many respects a further alkylation, or may be hydroxyalkylated by the addition of an alkylene oxide, such as ethylene oxide, propylene oxide, 1,2-butylene oxide or 2,3-butylene oxide. In the latter hydroxyalkylation step it will be appreciated that such hydroxyalkylation should take place under conditions which will avoid decomposition of the N-substituted-β-hydroxyethoxyacetamide. Also, in the case of alkylation and quaternization, if a secondary amine group is involved, a mildly alkaline acid acceptor, such as sodium bicarbonate, should be employed to avoid adversely affecting the amide portion of the molecule by the acid generated in the reaction. On the basis of the limitations hereinbefore described, conditions detrimental either to the initial reaction of 2-p-dioxanone with a primary amine group or to the stability of the N-substituted-β-hydroxyethoxyacetamide formed can be easily determined by chemists of ordinary skill and ability, and great elaboration here would seem unnecessary.

As mentioned hereinbefore, the N-substituted-β-hydroxyethoxyacetamide formed by the reaction between p-dioxanone and a primary amine group is capable of regenerating the original primary amine group by heating the amide in the presence of a strong alkali such as, for example, sodium hydroxide, potassium hydroxide and the like. Cold, dilute alkali has little effect, however, on the acetamide. The regeneration products include the original primary amine and the sodium- or potassium β-hydroxyethoxy acetate salt which can be removed from the desired component by conventional means such as distillation, crystallization or filtration. Further, it is an advantage of the present invention that the p-dioxanone may be reformed or recovered from the sodium or potassium salt by neutralization and distillation.

It is also possible, but less desirable, in accordance with the present invention to regenerate the original primary amine group from the N-substituted-β-hydroxyethoxyacetamide by treatment of the same with a strong acid, as for example, hydrochloric and sulfuric acids, in which case p-dioxanone by-product is β-hydroxyethoxyacetic acid which is easily reconverted to p-dioxanone. However, the regenerated primary amine group reacts with the strong acid to form an amine salt which may or may not be good, depending upon whether or not the amine salt is a desirable or desired product. If it is the desired product, of course, regeneration by treatment with a strong acid would be the better approach. If, however, the amine itself is the desired product, or if the amine salt has physical properties which make it difficult to handle and process, the better approach is to use a strong alkali, as hereinabove described, to regenerate the primary amine.

Illustrative examples of systems containing primary amines and nonheterocyclic amines of higher order which can be resolved employing the present invention include methylamine and dimethylamine; aniline and N-methylaniline; isopropylamine and methylethylamine; diethylamine and the isomeric butylamines; long-chain, fatty amines and their N-methyl derivatives.

Compounds containing both primary amine groups and nonheterocyclic amine groups of higher order within their molecular structure and which may be chemically modified after blocking of the primary amine group are myriad in number. In general, such compounds can be characterized by the formulae $H_2NYNHR$, $H_2NY[NHY']_nNH_2$ and $H_2NY[NHY']_nNHR$ wherein Y and Y' are alkylene or arylene groups, such as $-CH_2-$, $-CH_2CH_2-$, $-CH(CH_3)CH_2-$, $-CH_2CHOHCH_2-$, $-C_6H_4-$, $-C_{10}H_6-$, etc.; R is alkyl, aryl, alkylaryl, hydroxyalkyl, etc.; and $n$ is an integer. More illustratively, such compounds may include N-alkylethylenediamines, N-hydroxyalkylethylenediamines, diethylenetriamine, triethylenetetramine, monosubstituted propylene- or butylenediamines, and also mixtures such as those listed above. As mentioned earlier herein these compounds may contain noninterfering groups as substituents in the molecules.

The following examples are intended as illustrative of the underlying principles of the present invention and are not to be construed as unduly limiting thereof.

EXAMPLE 1

The preparation of N,N-di(hydroxypropyl)ethylenediamine is an example of our new process which may be illustrated schematically by the following equations:

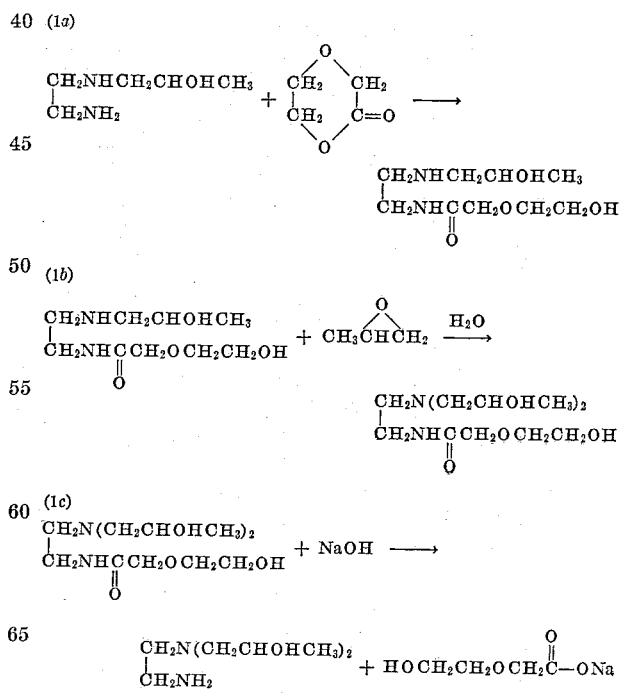

p-Dioxanone monomer (102 g., 1.0 mol) was added dropwise to 118 g. (1.0 mol) of stirred monohydroxypropylethylenediamine under substantially nonaqueous conditions. The reaction was exothermic and cooling was necessary during the addition to keep the temperature below 50° C. Stirring was continued 20 minutes at 50–60° C. before dilution with 200 ml. of water. The mixture was heated to 90° C. ±5°, and 61 g. (1.05 mol) of propylene oxide was added dropwise over a period of 30 minutes. After stirring an additional 20 minutes, 200 g. of 50% sodium hydroxide was added, and the mixture was stirred at gentle reflux 20 minutes. The product was separated with the aid of excess alkali and 100 ml. of 2,5-dimethylpyrazine. Distillation at reduced pressure afforded 87 g. (49%) of N,N-di(hydroxypropyl)ethylenediamine, a viscous liquid boiling at 143°–144° C. (2.8 mm.). The product had a neutral equivalent of 88.7 (theory: 88.1) and 7.95% tertiary nitrogen (theory: 7.95%). When the run was repeated on a 4.5-mol scale, there was obtained 640 g. (80%) of the same product. When the run was further repeated using polymeric p-dioxanone similar results were obtained.

EXAMPLE 2

N,N-Bis(β-Aminoethyl)-2-Hydroxypropylamine (2a)

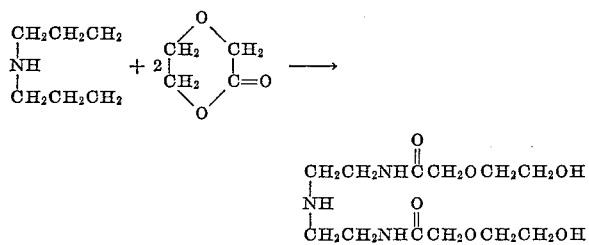

(2b)

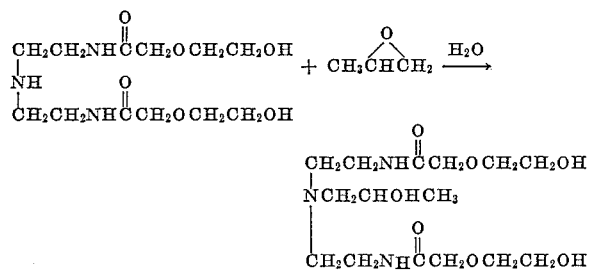

(2c)

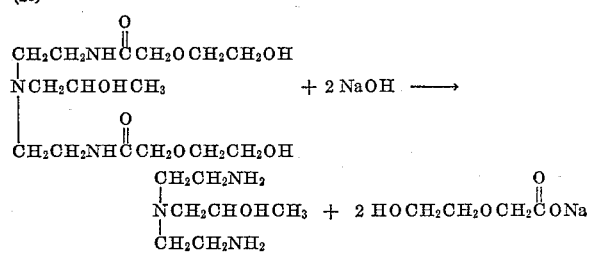

p-Dioxanone monomer (204 g., 2.0 mol) was added dropwise to 103 g. (1.0 mol) of diethylenetriamine under substantially nonaqueous conditions with stirring and cooling in order to keep the mixture below 50° C. After stirring 30 min., the viscous liquid was warmed to 90° C. and diluted with 300 ml. of water. Keeping the temperature at 88–93° C., 60 g. (1.05 mol) of propylene oxide was added over a period of 45 min. After stirring 30 min., 200 g. (2.5 mol) of 50% sodium hydroxide solution was added, and the solution was stirred 30 min. at 95–100° C. After cooling and addition of excess sodium hydroxide, a dark amine layer was separated and dried over sodium hydroxide pellets. Rectification at reduced pressure afforded 71 g. (44%) of N,N-bis(β-aminoethyl)-2-hydroxypropylamine boiling at 125–126° C. (1.5 mm.). The neutral equivalent, 82.0, was 3% high, indicative of contamination by diethylenetriamine.

EXAMPLE 3

N,N-Diallylethylenediamine (3a)

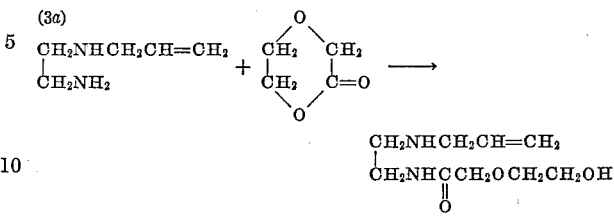

(3b)

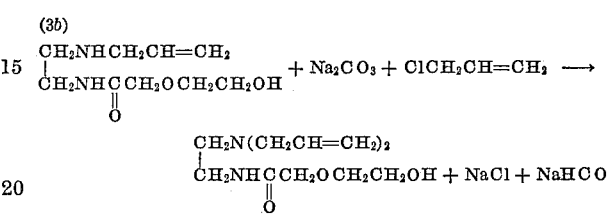

(3c)

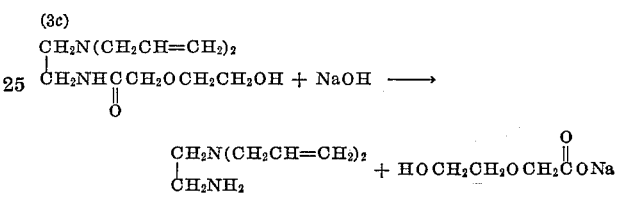

With stirring and cooling to keep the temperature below 50° C., 102 g. (1.0 mol) of p-dioxanone monomer was added to 100 g. (1.0 mol) of N-allylethylenediamine under substantially nonaqueous conditions. After the reaction was complete, the mixture was stirred 10 min. at 95° C., then diluted with 400 ml. of water containing 110 g. (1.05 mol) of sodium carbonate. To this mixture was added 83 g. (1.1 mol) of 3-chloropropene at 90–95° C. over a period of 90 min. The resulting mixture was stirred 15 min. before addition of 200 g. (2.5 mol) of 50% sodium hydroxide diluted with 200 g. of water. After 90 min. at 100° the solution was cooled, and the amine separated by the addition of excess sodium hydroxide. Rectification afforded 45 g. (32%) of N,N-diallylethylenediamine boiling at 184–186° C. There was no indication of the N,N'-derivative which is reported to boil at 198–200° C.[1]

EXAMPLE 4

N,N-Diallyl-N-Benzyl-N-(β-Aminoethyl)Ammonium Chloride (4a)

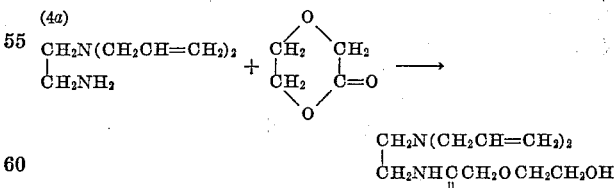

(4b)

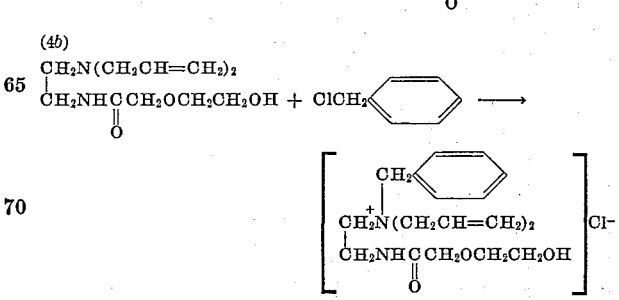

[1] W. R. Boon, J. Chem. Soc., 314 (1947).

(4c)

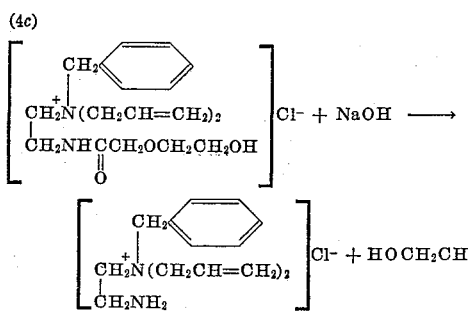

p-Dioxanone monomer (102 g., 1.0 mol) is added dropwise to 140 g. (1.0 mol) of N,N-diallylethylenediamine in 300 g. ethanol at 30–50° C. After stirring 20 min. the mixture is warmed to 80° C., and 126.5 g. (1.0 mol) of benzyl chloride is added. After refluxing 8 hr. the solution is diluted with 300 g. of water, 40 g. (1.0 mol) of sodium hydroxide is added, and the hydrolysis mixture is refluxed an additional 2 hr. The resulting mixture is evaporated to dryness, and the quaternary ammonium product extracted with hot, absolute ethanol, from which it is recovered by concentration and crystallization.

EXAMPLE 5

*Sodium Allyl-2-Aminoethyldithiocarbamate*

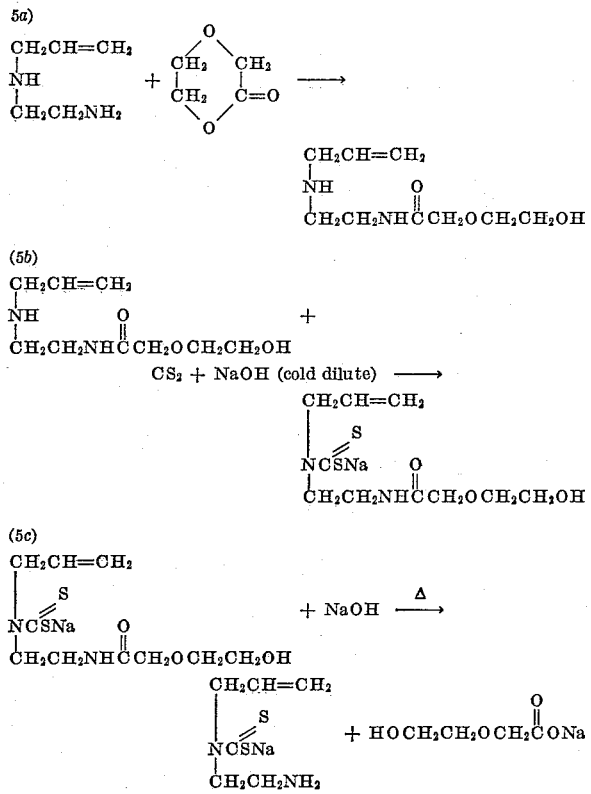

A substantially nonaqueous mixture containing 10.2 g. (0.10 mol) of p-dioxanone monomer and 10.0 g. (0.10 mol) of N-allylethylenediamine was allowed to react at 40–50° for 20 min., then cooled to 20° C. and diluted with a solution of 4 g. (0.10 mol) of sodium hydroxide in 50 ml. of water. The conditions of temperature and caustic concentration were such as not to adversely affect the amide formed. Carbon disulfide was added a little at a time with shaking and cooling to keep the temperature below 35° C. When nearly all the carbon disulfide had been dissolved, the mixture was warmed to 50° C. to complete the reaction and drive off the excess. The amide linkage was hydrolyzed by addition of 0.11 mol of sodium hydroxide and boiling for 15 min. The solution thus prepared contained sodium allyl-2-aminoethyldithiocarbamate and sodium β-hydroxy-ethoxyacetate and was used to prepare the copper and zinc salts according to the equations

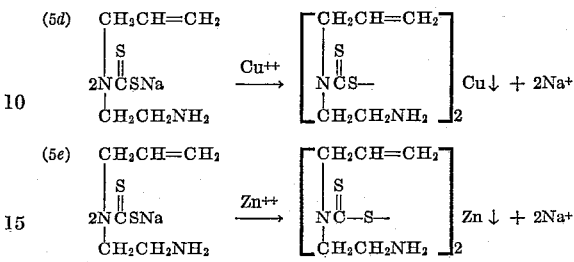

In both cases the dithiocarbamate salts precipitated leaving the acetates in solution.

EXAMPLE 6

*Separation of Diethylamine From Mixed Monobutylamines*

A substantially anhydrous mixture containing diethylamine, n-butylamine, isobutylamine and sec-butylamine, the butylamines being primary monoamines, is analyzed by conventional methods to determine the primary amine concentration. There is then added to the mixture, with stirring, sufficient p-dioxanone to provide about 1.05 mols of p-dioxanone per mol of primary amine in the mixture. Care is taken to maintain the temperature of the mixture below about 60° C., preferably between about 30° C. and 50° C. After stirring at this temperature for about 30 minutes, the temperature is raised gradually and diethylamine is distilled from the mixture and collected at a temperature of 54 to 56° C.

From an examination of the boiling points of the individual amines contained in the mixture, it will be apparent that separation of the diethylamine by simple distillation would be difficult if not impossible.

While this invention has been described and exemplified in terms of its preferred embodiments, those skilled in the art will appreciate that modifications can be made without departing from the spirit and scope of the invention.

What is claimed is:

1. A process for selectively blocking a primary amino radical in the presence of a nonheterocyclic amino radical of higher order by selectively converting said primary amino radical into an N-substituted-β-hydroxyethoxyacetamide group, which comprises, contacting 2-p-dioxanone with a mixed amine reactant at a temperature up to about 60° C. in a substantially anhydrous system, said mixed amine reactant being selected from the group consisting of (a) a mixture of a primary amine and a nonheterocyclic amine of higher order, (b) a polyamine containing a primary amino radical and a nonheterocyclic amino radical of higher order and (c) mixtures of (a) and (b).

2. The process of claim 1 wherein said mixed amine reactant is a mixture of a primary amine and a nonheterocyclic amine of higher order.

3. The process of claim 1 wherein said mixed amine reactant is a polyamine containing a primary amino radical and a nonheterocyclic amino radical of higher order.

4. The process of claim 1 wherein said mixed amine reactant is monohydroxypropylethylenediamine.

5. The process of claim 1 wherein said mixed amine reactant is diethylenetriamine.

6. The process of claim 1 wherein said mixed amine reactant is N-allylethylenediamine.

7. The process of claim 1 wherein said mixed amine reactant is N,N-diallylethylenediamine.

8. The process of claim 1 wherein said mixed amine reactant is a mixture of diethylamine, n-butylamine, iso-butylamine and sec-butylamine.

References Cited in the file of this patent

UNITED STATES PATENTS 2,901,004  Pinson et al. _____ June 14, 1960

FOREIGN PATENTS

C 19,125  Germany _____ July 19, 1956

OTHER REFERENCES

Degering: An Outline of Organic Nitrogen Compounds, published by University Lithoprinters, pages 397–389 (Ypsilanti, Mich.), 1950.

UNITED STATES PATENT OFFICE
CERTIFICATE OF CORRECTION

Patent No. 3,051,751                      August 28, 1962

William W. Levis, Jr., et al.

It is hereby certified that error appears in the above numbered patent requiring correction and that the said Letters Patent should read as corrected below.

Column 2, line 21, for "active" read -- native --; line 57, for "gruops" read -- groups --; column 5, lines 22 to 25, the left-hand portion of the formula should appear as shown below instead of as in the patent:

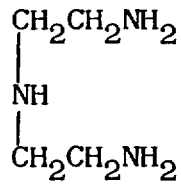

column 7, line 65, for "40-50°" read -- 40-50° C. --.

Signed and sealed this 8th day of October 1963.

(SEAL)
Attest:

ERNEST W. SWIDER                      EDWIN L. REYNOLDS
                                             Acting Commissioner of
Attesting Officer                      Patents